United States Patent [19]

Frey

[11] Patent Number: 5,101,180
[45] Date of Patent: Mar. 31, 1992

[54] BIDIRECTIONAL COMMUNICATION LINE FILTER AND SURGE PROTECTOR

[75] Inventor: Wilfred Frey, Calgary, Canada

[73] Assignee: Tycor International Inc., Calgary, Canada

[21] Appl. No.: 609,550

[22] Filed: Nov. 6, 1990

[51] Int. Cl.⁵ .................. H04B 3/28; H02H 3/22
[52] U.S. Cl. ...................... 333/12; 333/181; 361/111; 361/119
[58] Field of Search ............ 333/12, 176, 181, 185; 361/56, 57, 104, 111, 110, 113, 127, 119

[56] References Cited

U.S. PATENT DOCUMENTS

| | | | |
|---|---|---|---|
| 4,023,071 | 5/1977 | Fussell | 361/111 X |
| 4,792,310 | 12/1988 | Hori et al. | 333/181 X |
| 4,809,124 | 2/1989 | Kresge | 361/111 X |
| 4,920,328 | 4/1990 | Hayashi et al. | 338/21 |
| 4,922,366 | 5/1990 | Van Dick | 361/111 X |
| 4,979,071 | 12/1990 | Ito et al. | 361/104 X |

*Primary Examiner*—Eugene R. LaRoche
*Assistant Examiner*—Seung Ham
*Attorney, Agent, or Firm*—Rogers, Bereskin & Parr

[57] ABSTRACT

This invention relates to a communication line filter for use in series with communication lines. The communication line filter provides for surge protection from voltage spikes and provides frequency filtering to remove selected interference signals from other radiating sources. The communication line filter comprises: two signal conductors linked together by a fuse; a common signal ground; and two shunts for shunting a surge current between the signal conductors and the common signal ground. The shunts provide protection from short duration voltage spikes while the fuse provides protection from longer duration overvoltages. The communication line filter functions effectively, independent of the direction of current flow along the communication line with respect the line filter. The two shunts and the fuse are selected to provide the required capacitance and impedance respectively, to form a suitable frequency notch filter.

7 Claims, 2 Drawing Sheets

BIDIRECTIONAL COMMUNICATION LINE FILTER AND SURGE PROTECTOR

FIELD OF THE INVENTION

The invention relates to communication line filters. More specifically, the invention relates to an improved filter design suitable for surge protection of data communication lines and removal of FM broadcast band signal interference.

Communication line filters have traditionally been one of two separate types: a surge protection filter for filtering out voltage spikes; and a frequency filter for limiting the frequency response of a communication channel.

Surge protection is necessary to protect valuable installations utilizing high frequency data communication lines, without adversely affecting data communications. Typical installations requiring protection include Satellite Receivers, Local Area Networks, Wide Area Networks, Radio Communication Equipment and any form of linked equipment where communication is required from non-local or remote locations. Sources of potentially damaging voltage spikes include lightning strikes, switching in or disconnection of equipment along the communication line and short circuits in the communication line.

Surge protection filters have been constructed utilizing Zener diodes selected to shunt current across a signal source to ground when the voltage across the diode exceeds an arbitrary design threshold. A voltage in excess of a selected threshold is termed an overvoltage. Varistors have also been used as protective elements to shunt current in the event of an overvoltage. Varistors have symmetrical current-voltage characteristics for positive and negative voltages, resistance values which decrease rapidly with increasing voltage once a voltage threshold is reached, and greater load capacity than typical Zener diodes. Thus, varistors are often preferred to Zener diodes in surge protection filter applications.

Selection of an appropriate current shunt depends on numerous application parameters including: the intended range of operating voltages of the AC line (so as not to impair the characteristics of the data transmission channel); the typical surge current to be protected against; the desired maximum voltage increase across the shunt in the event of an overvoltage; and the response time of the shunt to an overvoltage.

To provide protection against overvoltages of long duration, known designs include a fuse in series with the signal conductor, as well as a current shunt, between the signal conductor and ground. The fuse is utilized to protect the current shunt from damage as a result of too high a level of energy absorbtion, as well as to protect the terminal side of a communication line in the event of a failure of the current shunt. To achieve both of the above protective functions, the fuse should be positioned on the voltage source side of the signal conductor with respect to the current shunt.

Fuses generally do not respond as fast to an overvoltage as current shunts in the form of varistors and therefor do not provide as effective overvoltage protection; fuses are essentially over current devices which heat up and melt to achieve an open circuit. A fuse on the voltage source side of the current shunt will be subject to at least as much surge current as the shunt. The fuse can therefor be used to protect the varistor by limiting the duration of the surge current: it being preferable that the fuse open circuit before the varistor fail, thus ensuring the surge protection filter does not conduct current while only partially functional.

The combination current shunt and fuse form of surge protection filter can cause consumer confusion because it is not bidirectional. If a consumer inadvertently hooks up the filter input as an output and the output as an input, the current shunt or varistor will provide surge protection for the downstream fuse until such time as the shunt fails. Surge protection will then be reduced to that afforded by a single fuse. The surge protection filter may then continue to conduct current, despite the loss of a significant portion of protective capability.

An alternative surge protection filter design (as described in the 1978 Siemens Metal Oxide Varistor Data Book at page 103) employs a surge voltage protector (SVP) as a current shunt between a signal conductor and ground, along with a varistor acting as a parallel current shunt. The varistor is intended to provide fast response to an overvoltage with the SVP providing protection in the event of longer duration overvoltages. The SVP operates as a voltage sensitive switch, forming a low resistance path to ground when activated. When an overvoltage occurs at a level above the SVP's ignition voltage, the SVP switches into an arc mode, shunting most of the surge current. SVPs have very high surge current handling capability but comparatively slow response times compared to varistors. This form of circuit operates independently of the direction of the surge current along the communication line with respect to the filter. However, failure of the fast acting current shunt (varistor) is still possible before the SVP takes over. The user may then be left without any indication, once the surge has subsided, that damage has occurred and the filter can no longer respond quickly to an overvoltage.

Other surge protection filters have been constructed utilizing multiple current shunts for protection from fluctuating power supplies. These designs employ parallel current shunts connecting the power line to ground, with a series impedances (usually inductors) along the power line between the parallel current shunts. The multiple current shunts and series impedances are selected to provide stepped down and smoothed voltage along the power line. However, such an approach would distort an alternating cycle data transmission.

As mentioned above, other types of communication line filters are utilized to limit the frequency response of a communication channel. A recurring problem with data communication lines is that they pick up FM broadcast band signals causing undesirable interference with other signals such as cable television signals. Hence FM filters are often used to eliminate the interference and may be included in a communication line in series with a surge protection filter. However, the more frequently a cable television or other communication line is spliced to insert additional filters, the greater the potential for signal loss and noise.

SUMMARY OF THE INVENTION

According to the present invention, there is provided a communication line filter comprising: first and second signal conductors linked together by a fuse means; a common signal ground; and first and second shunting means for shunting a surge current between a respective signal conductor and the signal ground. The shunting means provide protection from short duration voltage spikes while the fuse means provides protection from longer duration overvoltages and the filter configuration allows the filter to function effectively independent of the direction of current flow along the communication line.

A selection criteria for the current shunting means and fuse means is capacitance and inductance respectively, thus allowing the invention to perform the functions of a surge protection filter and a frequency filter for the removal of interference signals.

BRIEF DESCRIPTION OF THE DRAWINGS

Further objects and advantages of the invention will appear from the following description, taken together with the accompanying drawings in which.

DETAILED DESCRIPTION OF PREFERRED EMBODIMENT

Figure 1:
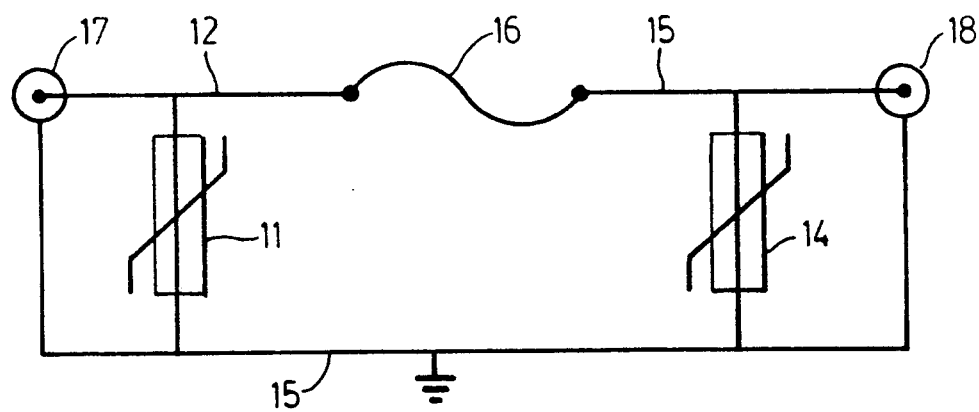
FIG. 1 is a schematic of a communication line filter according to the invention.

FIG. 1 illustrates a communication line filter 10 as embodied in the present invention. In the preferred embodiment, the communication line filter 10 utilizes two varistors 11,14 which act as shunting means to shunt surge current resulting from a voltage spike travelling along signal conductors 12,15. The surge current is shunted from the respective signal conductors 12,15 to a common signal ground 13. The varistors 11,14 are voltage sensitive devices which will not shunt current unless the voltage difference across the device is in excess of a selected voltage threshold.

A fuse 16 is connected in series with the signal conductors 12,15 and is selected to provide backup protection against a current passing along the signal conductors 12,15 which would be too high to be shunted by the varistors 11,14 or which was maintained for a prolonged period and required energy absorbtion above that specified for the varistors. The fuse is selected to open circuit or melt before damage to the communication line filter 10 or connected communication lines occurs.

When a communication signal and a voltage spike combine along a communication line, an overvoltage and an associated surge current result. As the overvoltage passes along the signal conductors 12,15, if the voltage thresholds of the varistors 11,14 are exceeded, their impedance will decrease, thus causing the shunting of a portion of the surge current from the respective signal conductors 12, 15 to the common signal ground 13. As current is shunted, the internal energy of the voltage spike passing along the communication line, beyond the varistors 11,14, is reduced. This reduces the voltage seen across the output or protected terminals of the communication line filter 10.

The varistors 11,14 are selected so as not to shunt current during regular data communications. This is achieved by selecting varistors 11,14 with higher operating voltages (i.e. the voltage levels where the internal resistance of the varistors begins to drop rapidly) relative to the voltage levels for normal data communication. In the preferred embodiment, the first and second varistors 11,14 are metal oxide varistors with an operating voltage of 130 volts rms.

In the preferred embodiment, the fuse 16 is matched to a form of coaxial cable commonly used to deliver home cable television signals. A fuse rated at 5 amperes is used to provide protection for coaxial cable with a 22 gauge conductor and a maximum current rating of 7 amperes.

The first and second varistors 11, 14 are selected to have the same operating characteristics, thus making the communication line filter 10 functionally equivalent regardless of which direction along the signal conductors 12,15 a surge current travels. The varistors 11,14, having the same operating characteristics, will split the surge current between them in approximately equal proportions. The fuse 16 will be subject to a current greater than or equal to the surge current carried by which ever varistor, 11 or 14, is on the protected or downstream side of the fuse 16. A sustained surge current can nevertheless damage the varistors 11,14 as a result of excessive energy absorbtion. The fuse 16 therefor act as a fail safe mechanism in the event of the varistors 11, 14 failing. In the preferred embodiment, the varistors 11, 14 are selected to have an ability to handle a 2500 Amp peak surge current pulse of 20 microseconds duration and 10,000 surge current pulses of 2 millisecond duration having a magnitudes of 10 amps, provided the energy absorbtion of each varistor does not exceed 30 Watt-seconds.

A first cable connector 17 having a signal and a ground terminal, is attached to the first signal conductor 12 and the common signal ground 13 respectively. A second cable connector 18 is similarly connected to the second signal conductor 15 and the common signal ground 13. The form of cable connector selected for the communication line filter 10 is based on the form most suitable for the intended application as would be obvious to anyone skilled in the art. The cable connectors 17,18 in the preferred embodiment are coaxial cable connectors of the same sex, selected for compatibility with coaxial cable commonly used to deliver home cable television signals. Since the communication line filter 10 has symmetrical properties, independent of the flow of current along the signal conductors 12, 15, users need not concern themselves as to which communication line connects to which cable connector 17, 18.

Figure 2:
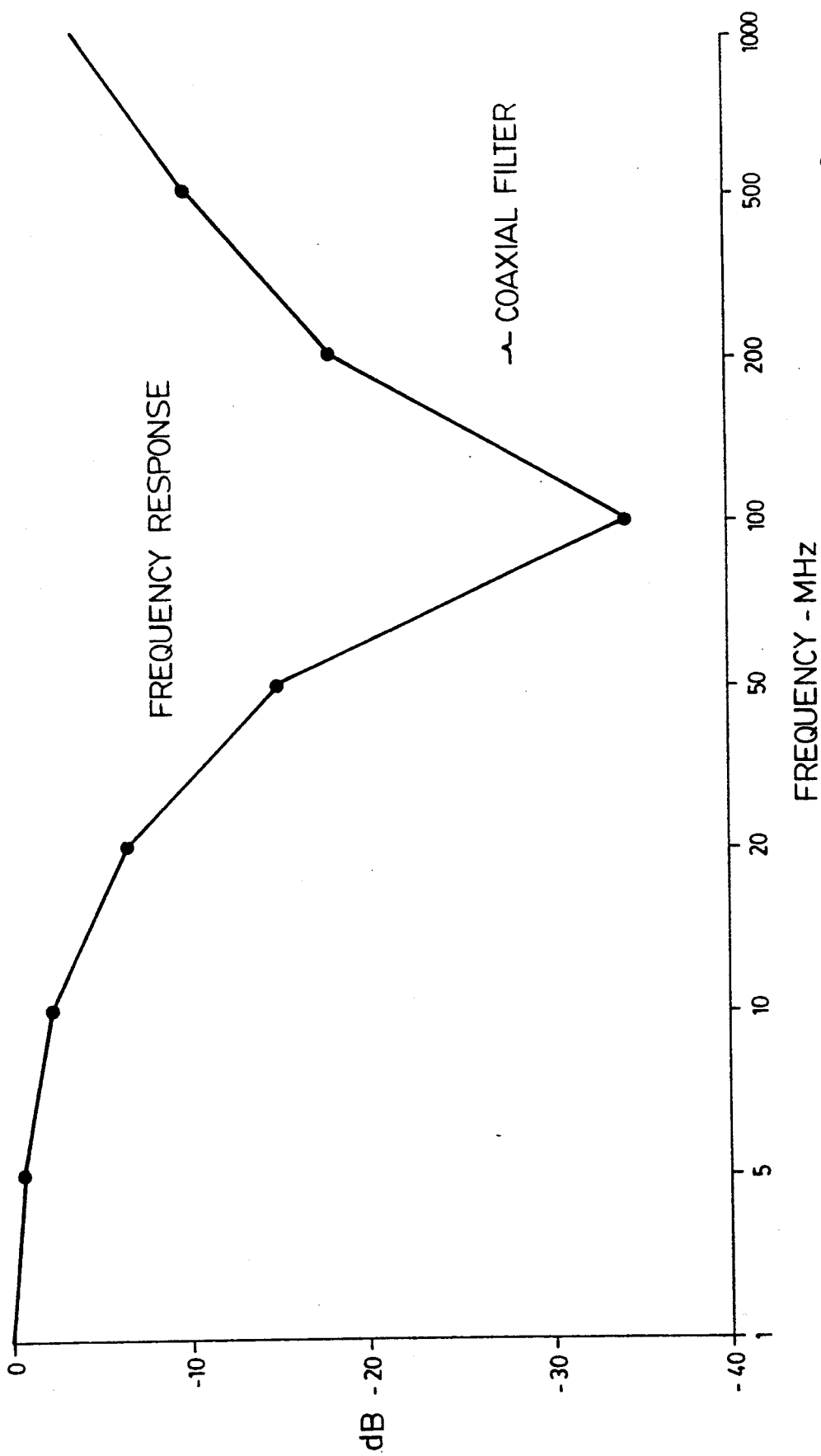
FIG. 2 is a frequency response of the present invention for selected component values.

The communication line filter 10, in addition to providing surge protection, also forms a $\pi$ (pi) network and provides filtering to remove unwanted FM broadcast band signals which are often picked up by coaxial cables causing interference. These interference signals have a frequency near 100 MHz. Varistors have a construction similar to plate capacitors. Thus., varistors can be obtained with different nominal values of capacitance. In the preferred embodiment of this invention, the varistors 11, 14 are selected to have a nominal capacitance of 500 picofarads as well as an operating voltage of 130 volt rms, as provided for by the Siemens SIOV-S20K130 metal oxide varistor. When the varistors 11,14 are combined with a suitable fuse 16 having a small inductance and a 5 ampere rating, a notch filter is formed which is suitable for removal of FM broadcast band signals. FIG. 2 illustrates the frequency response obtained.

Figure 4:
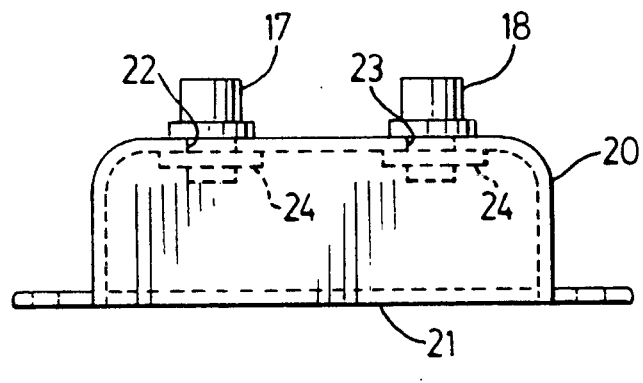
FIG. 4 is a side view of the enclosure of FIG. 3.
Figure 3:
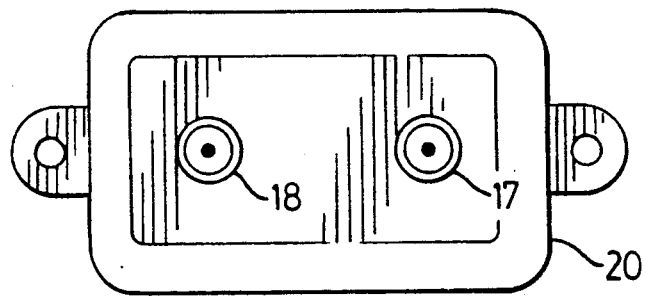
FIG. 3 is a top plan view of an enclosure for a communication line filter according to the invention.

FIG. 3 illustrates the top plan view of the present invention as enclosed in a practical enclosure 19 together with the cable connectors 17, 18. FIG. 4 illustrates a side view of the enclosure of FIG. 3. The enclosure is formed of two pieces, a substantially rectangular main housing 20 and a base plate 21. Two holes 22, 23 are drilled into the main housing 20 to accommodate the cable connectors 17, 18 which are held to the main housing 20 by retaining nuts 24. The base plate 21 is soldered to the main housing. It will be clear to those skilled in the art that different forms of enclosures may be utilized.

It will be evident to those skilled in the art that other embodiments of the invention fall within its spirit and scope, as defined by the following claims.

I claim:

1. A bidirectional communication line filter for use in series with communication lines, the filter comprising:
    first and second signal conducting means;
    fuse means connected in series with and between said first and second signal conducting means;
    a common signal ground;
    first shunting means for shunting surge current from the first signal conducting means to the common signal ground; and
    second shunting means for shunting surge current from the second conducting means to the common signal ground.

2. The bidirectional communication line filter according to claim 1, wherein the first shunting means has substantially the same performance characteristics as the second shunting means, to provide the filter with symmetrical properties independent of the direction of the flow of the current along the first and second signal conducting means.

3. The bidirectional communication line filter according to claim 2, wherein the first and second shunting means are varistors.

4. The bidirectional communication line filter according to claim 3 and further comprising:
    an enclosure;
    first cable connecting means in the form of a coaxial cable connector coupled to said first signal conducting means, wherein a coaxial line having a signal conductor and ground can be connected to said first signal conducting means and to said common signal ground respectively; and
    second cable connecting means in the form of a coaxial cable connector coupled to said second signal conducting means, wherein a coaxial line having a signal conductor and ground can be connected to said second signal conducting means and to said common signal ground respectively.

5. The bidirectional communication line filter according to claim 4, wherein the varistors selected as the first and second shunting means each have a nominal operating voltage of 130 volts rms and the fuse means is a fuse with a 5 ampere rating.

6. The bidirectional communication line filter according to claim 1,2,3,3,4 or 5, wherein said first and second shunting means have capacitance characteristics, and said fuse means has impedance characteristics, and said capacitance characteristics and impedance characteristics are matched so that said bidirectional communication line filter functions both as a surge protection filter and as a notch filter for suppressing FM broadcast band signals at frequencies near 100 Megahertz.

7. The bidirectional communication line filter according to claim 1,2,3,4 or 5, wherein said first and second shunting means have capacitance characteristics, and said fuse means has impedance characteristics, and said capacitance characteristics and impedance characteristics are matched so that said bidirectional communication line filter functions both as a surge protection filter and as a notch filter for suppressing selected frequencies based on said capacitance and impedance characteristics.

* * * * *